(12) United States Patent
Saini et al.

(10) Patent No.: US 10,140,356 B2
(45) Date of Patent: Nov. 27, 2018

(54) METHODS AND SYSTEMS FOR GENERATION AND TRANSMISSION OF ELECTRONIC INFORMATION USING REAL-TIME AND HISTORICAL DATA

(71) Applicant: Wipro Limited, Bangalore (IN)

(72) Inventors: Shwetank Saini, Saharanpur (IN); Pankaj Bande, Nagpur (IN); Puneet Singh, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 485 days.

(21) Appl. No.: 15/087,546

(22) Filed: Mar. 31, 2016

(65) Prior Publication Data
US 2017/0262450 A1  Sep. 14, 2017

(30) Foreign Application Priority Data

Mar. 11, 2016 (IN) .............................. 201641008554

(51) Int. Cl.
*G06F 17/30* (2006.01)
(52) U.S. Cl.
CPC .. *G06F 17/30598* (2013.01); *G06F 17/30873* (2013.01); *G06F 17/30994* (2013.01)
(58) Field of Classification Search
CPC ................................................ G06F 17/30598
USPC .................................................. 707/723, 705
See application file for complete search history.

(56) References Cited

U.S. PATENT DOCUMENTS

| 5,701,139 | A | 12/1997 | Weinbaum et al. |
| 7,945,434 | B2 | 5/2011 | Lovas et al. |
| 8,112,369 | B2 | 2/2012 | Abramson |
| 9,208,453 | B2 * | 12/2015 | Sinha ..................... G06Q 10/00 |
| | | | 707/705 |
| 2005/0054381 | A1 | 3/2005 | Lee et al. |
| 2005/0143138 | A1 | 6/2005 | Lee et al. |
| 2013/0179365 | A1 | 7/2013 | Passova et al. |
| 2017/0255536 | A1 * | 9/2017 | Weissinger ............. H04L 65/60 |

FOREIGN PATENT DOCUMENTS

CA     2 505 909      5/2004

* cited by examiner

*Primary Examiner* — Chelcie L Daye
(74) *Attorney, Agent, or Firm* — Finnegan, Henderson, Farabow, Garrett & Dunner LLP

(57) ABSTRACT

This disclosure relates generally to data processing, and more particularly, to methods and systems for generation and transmission of information based on real-time and historical data. In one embodiment, a hardware processor-implemented method for generating and transmitting information is provided. The method comprises: receiving real-time from a plurality of data sources, extracting information items from the real-time data, wherein each of the plurality of information items is associated with an attribute of a first type, an attribute of a second type, and a first score; determining a first attribute of the first type associated with a maximum first sum of aggregated first scores, a second attribute of the second type associated with a minimum second sum of aggregated first scores; determining a first information item for transmission based on the first and second attributes; and providing the first information item for transmission to a target location.

20 Claims, 6 Drawing Sheets

200

| Information item ID | Attribute of a first type | Attribute of a second type | Score |
|---|---|---|---|
| 0001 | Clothes | Indian | 100 |
| 0002 | Food | American | 50 |

| Attributes of second type / Attributes of first type | Indian | American |
|---|---|---|
| Clothes | 5000 | 20000 |
| Food | 3000 | 400 |

FIG. 2B

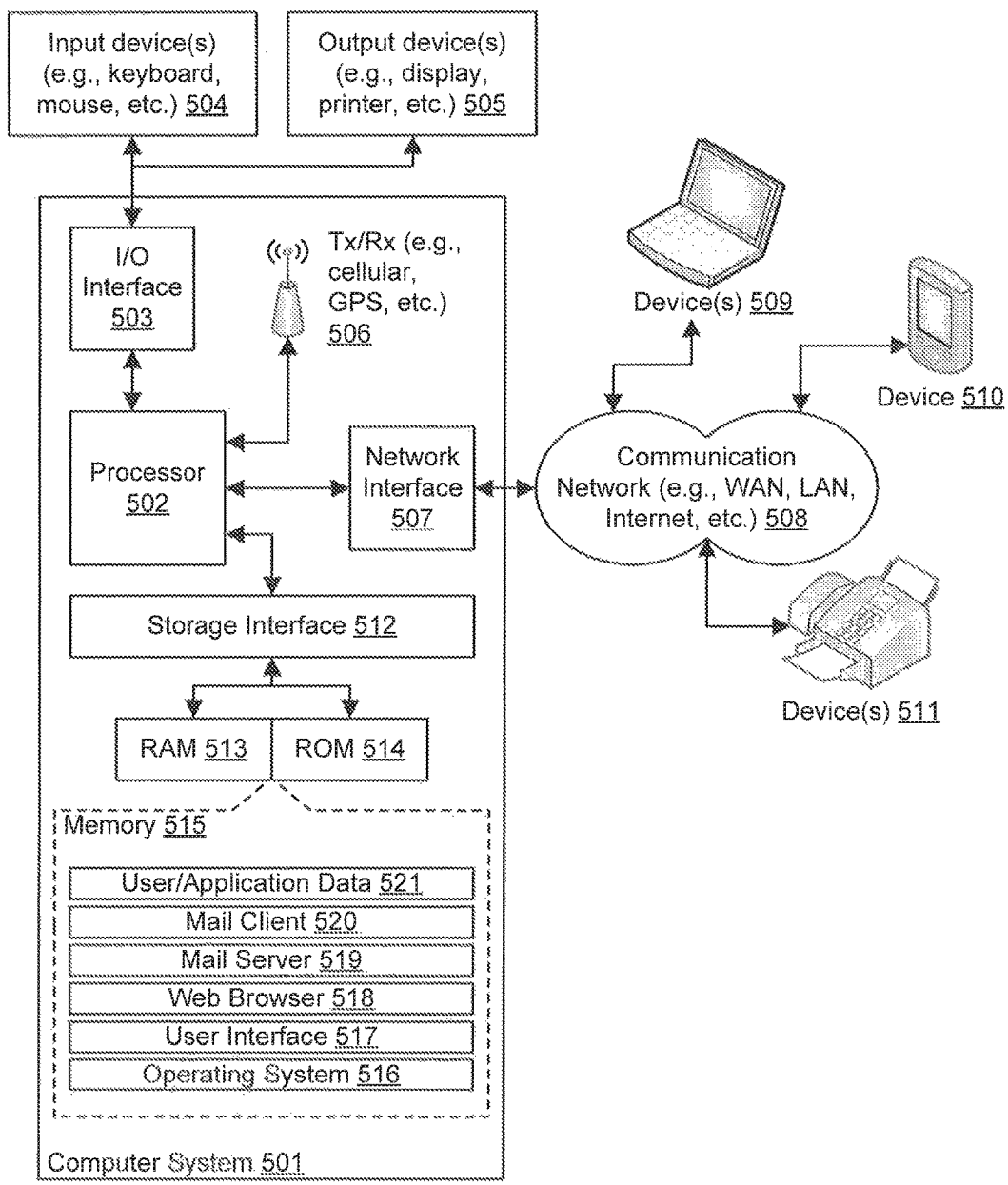
FIG. 5: Example Computer System

US 10,140,356 B2

METHODS AND SYSTEMS FOR GENERATION AND TRANSMISSION OF ELECTRONIC INFORMATION USING REAL-TIME AND HISTORICAL DATA

TECHNICAL FIELD

This disclosure relates generally to data processing, and more particularly, to methods and systems for generation and transmission of information based on real-time and historical data.

BACKGROUND

With the advance of Internet and Big data, a user can receive targeted electronic information when they engage in certain activities, with the targeted electronic information generated based on both an activity the user is engaging in, as well as a history of activities the user has engaged in. For example, a web server that hosts an e-commerce website may, after detecting that a user is browsing the site, transmit electronic advertisement information to the user based on the user's shopping history. For example, if based on the user's shopping history, the web server determines that the user has been buying a certain category of products, the web server may transmit electronic advertisement information related to that category of products to the user, after detecting that the user is browsing the web page that displays that category of products.

A conventional system typically provides information that is tailored in conformance with the history of activities of the user as well as a current activity of the user. Using the example above, the web server typically does not transmit electronic advertisement information related to a category of products that the user has never purchased before, nor will it transmit information that is unrelated to an activity the user is not engaging in. As an illustrative example, if the web server determines that the user has been purchasing Indian food, while the web server may transmit electronic advertisement information related to products related to Indian food (e.g., Indian clothing, Indian magazine, etc.), under the current technologies it is unlikely that the web server would transmit information related to, for example, American toys. Also, if the web server determines that the user is browsing a page that displays Indian foods, it is also unlikely that the web server would transmit information related to American toys.

The inventors here have recognized several technical problems with such conventional systems. First, by focusing only a certain user's activity history and tailoring the information accordingly, the range of information provided can be too narrow, and the user may miss out on information that may be of interest (or useful). Using the example above, it may be that a user who has a long history of purchasing Indian food may also be interested in other ethnic foods, but it is unlikely that the user will receive such information from the conventional systems. As another example, there may be a strong interest among other users about a particular product not related to Indian food, but it is also unlikely that the user will receive information about the particular product, even if that particular product may be of interest or useful to the user.

Second, the range of information provided by the conventional systems can also be too narrow for creating diverse user experience, if the information is provided based only on a user's current activity. For example, if every user who visits a website that sells toys only receives information (e.g., promotion offer) about toys, but not information that may bring their attention to other sets of products or activities, the system may only succeed in maintaining or promoting these users' interests in the toys, but not other products or activities.

SUMMARY

Embodiments of the present disclosure present technological improvements as solutions to the above-mentioned technical problems, among others. For example, in one embodiment, a hardware processor-implemented method for generating and transmitting information is provided. The method comprises: receiving real-time from a plurality of data sources; extracting a plurality of information items from the real-time data, wherein each of the plurality of information items is associated with an attribute of a first type, an attribute of a second type, and a first score; determining a plurality of attribute associations, wherein each of the plurality of attribute associations include one attribute of the first type and one attribute of the second type; determining, based on the first scores, an aggregate score for each of the plurality of attribute associations; determining a first sum of aggregate scores for each attribute of the first type; determining a second sum of aggregate scores for each attribute of the second type; determining a first attribute of the first type associated with a maximum first sum of aggregate scores, a second attribute of the second type associated with a minimum second sum of aggregate scores; determining a first information item for transmission based on the first and second attributes; determining a target location for transmission; and providing the first information item for transmission to the target location.

In another embodiment, a system or generating and transmitting information is provided. The system comprises: one or more hardware processors; and a memory storing instructions executable by the one or more hardware processors for: receiving real-time from a plurality of data sources; extracting a plurality of information items from the real-time data, wherein each of the plurality of information items is associated with an attribute of a first type, an attribute of a second type, and a first score; determining a plurality of attribute associations, wherein each of the plurality of attribute associations include one attribute of the first type and one attribute of the second type; determining, based on the first scores, an aggregate score for each of the plurality of attribute associations; determining a first sum of aggregate scores for each attribute of the first type; determining a second sum of aggregate scores for each attribute of the second type; determining a first attribute of the first type associated with a maximum first sum of aggregate scores, a second attribute of the second type associated with a minimum second sum of aggregate scores; determining a first information item for transmission based on the first and second attributes; determining a target location for transmission; and providing the first information item for transmission to the target location.

In yet another embodiment, a non-transitory computer readable storage medium is provided. The non-transitory computer readable storage medium stores a program that, when executed by one or more hardware processors, causes the one or more hardware processors to perform a method for generating and transmitting information. The method comprises: receiving real-time from a plurality of data sources; extracting a plurality of information items from the real-time data, wherein each of the plurality of information items is associated with an attribute of a first type, an attribute of a second type, and a first score; determining a plurality of attribute associations, wherein each of the plurality of attribute associations include one attribute of the first type and one attribute of the second type; determining, based on the first scores, an aggregate score for each of the plurality of attribute associations; determining a first sum of aggregate scores for each attribute of the first type; determining a second sum of aggregate scores for each attribute of the second type; determining a first attribute of the first type associated with a maximum first sum of aggregate scores, a second attribute of the second type associated with a minimum second sum of aggregate scores; determining a first information item for transmission based on the first and second attributes; determining a target location for transmission; and providing the first information item for transmission to the target location, wherein the target location is a web server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 2A-2B illustrate exemplary data structures for analyzing real-time data for generating and transmitting information, according to some embodiments of the present disclosure.

FIG. 5 is a block diagram of an exemplary computer system for implementing embodiments consistent with the present disclosure.

DETAILED DESCRIPTION

Figure 1:
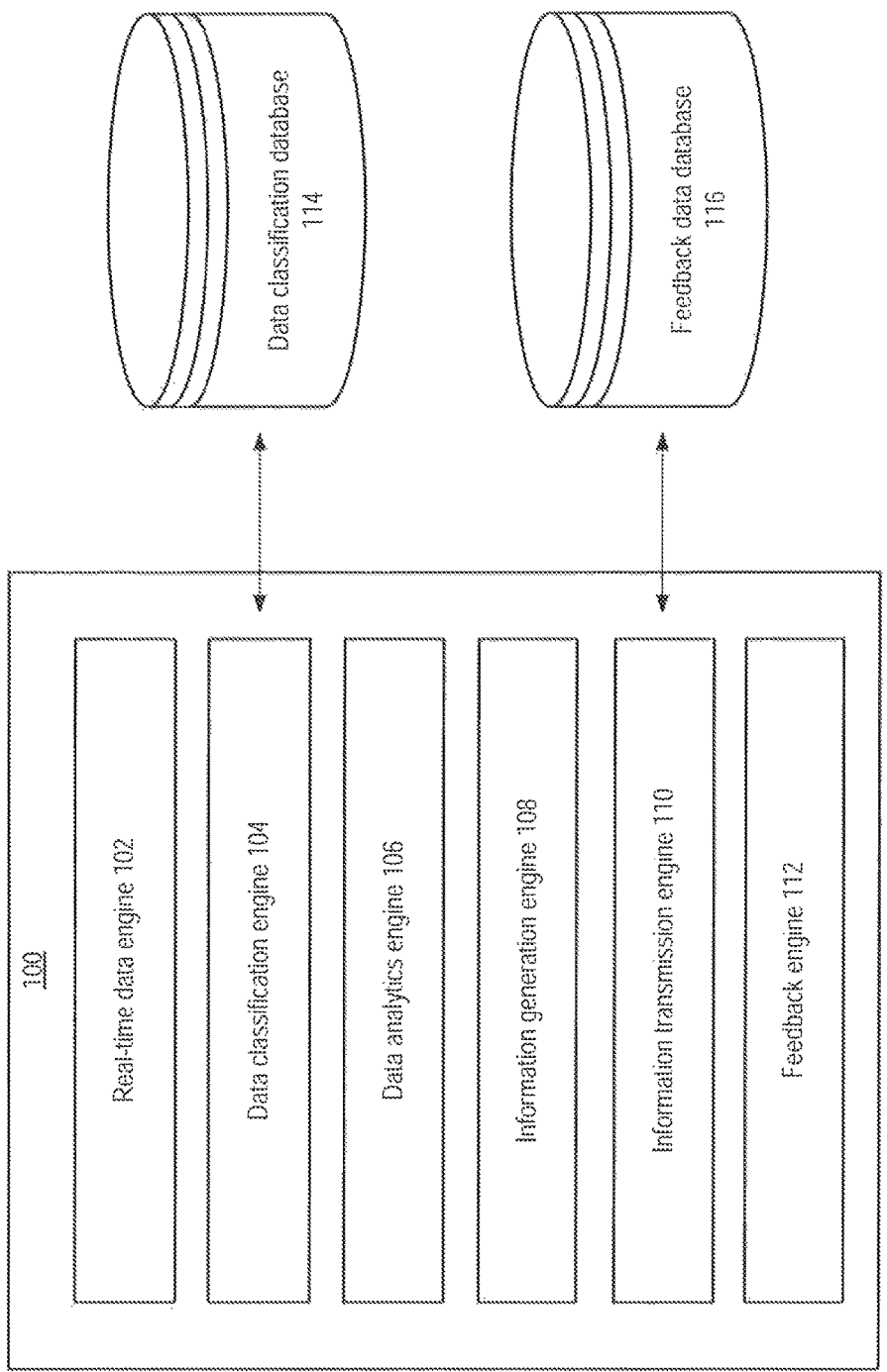
FIG. 1 illustrates an exemplary system for generating and transmitting information based on real-time and historical data, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

With embodiments of the present disclosure, a system may receive real-time data from a plurality of data sources and associated with a plurality of users. The system may extract a plurality of information items from the real-time data, associate each information item with a first type of attribute, a second type of attribute, and a score based on the data sources. The first type of attribute can refer to, for example, a product type, an activity type, etc. The second type of attribute can refer to, for example, certain attributes of the product or activity, such as ethnic origin, location origin, targeted age group, targeted gender, etc. The score may reflect a degree of engagement, such as expenditure, with the product or the activity associated with that information item. Based on the scores, the system may perform an analysis to determine a first attribute of the first type (e.g., a product type, an activity type) that is associated with a maximum aggregate score, which can indicate a maximum degree of engagement, and a second attribute of the second type (e.g., ethnic origin, location origin, targeted age group, targeted gender, etc.) that is associated with a minimum aggregate score, which can indicate a minimum degree of engagement.

The system may then determine to transmit an information item associated with the first and second attributes, to bring to the user's attention about a type of product or a type of activity that is the most explored by a group of users (as reflected by the maximum degree of engagement), but which is also associated with a certain attribute (e.g., ethnic origin, location origin, targeted age group, targeted gender, etc.) that is the least explored by that group of users (as reflected by a minimum degree engagement). The system may also determine other configuration information for the transmission of information, such as one or more senders for transmitting the information (e.g., an operator of a web site), one or more target locations for transmitting the information (e.g., a web site), based on the aforementioned analysis. At least some of the configuration information can be determined based on historical feedback data after prior transmission of information, and the configuration information can be updated based on real-time feedback data as well. With such arrangements, the range of information provided to the users can be broadened, and user experience can be improved as a result.

FIG. 1 illustrates an exemplary system 100 for generating and transmitting information based on real-time and historical data, according to some embodiments of the present disclosure. As shown in FIG. 1, system 100 may include a real-time data engine 102, a data classification engine 104, a data analytics engine 106, an information generation engine 108, an information transmission engine 110, and a feedback engine 112. For the purposes of this disclosure, "modules" may be implemented in software, hardware, firmware, a mix of any of those, or the like. For example, if the disclosed "modules" are implemented in software, they may be stored in a memory associated with system 100. Processors, I/O devices, and memory devices may be used to perform processes to implement and facilitate operations of the modules. Thus, the modules may include code instructions executable by one or more processors, alone or in various combinations with other modules disclosed in this or other embodiments. If the disclosed "modules" are implemented in hardware, they may comprise an embedded system or other dedicated hardware configured by machine code, assembly code, or the like to interact with other modules to perform functions consistent with disclosed embodiments.

In some embodiments, real-time data engine 102 can receive data, in real-time, from multiple data sources. The data sources can include, for example, databases that store transaction data related to the purchase of a certain product, or an activity (e.g., purchasing a service) by a user. The transaction data can include, for example, the expense in the purchase, information about a type of the product or the activity (e.g., food, clothing, etc.), and information about an attribute of the product or the service (e.g., ethnic origin, location origin, targeted age group, targeted gender, etc.). The data sources can also include, for example, web servers that host web sites (e.g., Facebook™, Twitter™, etc.) which may publish users' comments about certain products and services. Real-time data engine 102 may transmit periodic requests to the databases and servers for the data, or may receive the data as part of a news feed from the web sites. Real-time data engine 102 may also receive additional information, such as demographic information of a user engaged in a transaction (e.g., age, ethnicity, gender, marital status, education, etc.), location information of the user, etc.

After receiving the data, real-time data engine 102 may provide the received data to data classification engine 104, which can parse the data to generate a plurality of information items, and for each information item, generate an information item identifier, an attribute of a first type, an attribute of a second type, and a score. An attribute of the first type can include, for example, a type of a product (e.g., food, and clothing), a type of activity (e.g., sports and social events), etc. An attribute of a second type can include other attributes associated with a particular product or with a particular activity, such as ethnic origin, targeted age group, targeted gender, location, etc. The score can reflect a degree of engagement. As an illustrative example, the degree of engagement may be reflected by a user's expenditure on the particular product or activity in a transaction, a user's comments about the product or activity in a social media posting, etc.

In some embodiments, the score can be calculated based on a predetermined weight. The weight can be predetermined to reflect, for example, a degree if relationship between the data and a degree of engagement. As an illustrative example, the system may assign a higher weightage to a score calculated based on expenditure on the purchase of a product or on an activity (e.g., as reflected in the transaction data), based on a determination that the expenditure is more likely to reflect the user's degree of engagement and interest in that product or activity, than a score calculated based user's comments about the product or activity in a social media posting.

Reference is now made to FIG. 2A, which illustrates an exemplary record 200 of information items that can be generated by data classification engine 104 of FIG. 1. As shown in FIG. 2A, record 200 includes to information items 0001 and 0002. Information item 0001 may be extracted from a transaction record for a purchase of a saree by a user from an online fashion store, and can be associated with "clothes" as an attribute of a first type (e.g., as a type of product), "Indian" as an attribute of a second type (e.g., as ethnic origin), and a score (e.g., reflected by expense on the saree). Also, information item 0002 may be extracted from a social media posting about American hamburgers and fries, and can be associated with "food" as an attribute of a first type (e.g., as a type of product), "American" as an attribute of a second type (e.g., as location of origin), and a score which can be lower than that for information item 0001. Further, each information item listed in record 200 may also be associated with other information content (e.g., information about a product, a link to a different web site associated with the product, etc.), location information (e.g., an URL of a web site where the real-time data including the information item is acquired, sender information (e.g., a domain name of an operator of the web site, an IP address of the web server that hosts the web site), etc.

Referring back to FIG. 1, data classification engine 104 may store data for record 200 at data classification database 114. Data analytics engine 106 may then acquire data of record 200 to perform an analysis. The analysis may include determining, from record 200, a type of product or a type of activity that is the most explored by a group of users (as reflected by the maximum engagement), but which is also associated with a certain attribute (e.g., ethnic origin, targeted age group, targeted gender, location, etc.) that is the least explored by the group of users (as reflected by the minimum engagement), and to generate an information item associated with the determined type of product/activity and with the determined attribute.

In some embodiments, the analysis may include creating different associations of the attributes of the first type and second type, and determining an aggregate score for each attribute association. The aggregate score for each attribute association can be determined based on the scores associated with the information items of record 200 that are associated with the attributes of first and second types included in the attribute association.

In some embodiments, data classification engine 104 may group and filter the information items extracted from real-time data, as well as the attributes of the first and second types, based on additional criteria. The criteria may include, for example, the demographic group (and/or location) of the users associated with the real-time data (e.g., a user engaged in transactions included in the real-time data) being part of a pre-set demographic group. For example, data classification engine 104 may filter the information items and the attributes such that only those associated with users of a particular age group, a particular ethnic group, or a location, etc. can be extracted, and data classification engine 104 only determines the attributes of the first and second types, and the different associations of attributes of the first and second types, for the filtered information items only. As to be discussed below, the set of demographic group can be determined by a machine learning model constructed and updated based on historical feedback data reflecting the users' responses to the provided information item.

Reference is now made to FIG. 2B, which illustrates an exemplary record 250 that can be generated as part of the analysis by data analytics engine 106. For example, as shown in FIG. 2B, the attribute pair ("Indian", "clothes") is associated with an aggregate score of 5000, which can be determined by aggregating the scores of information items, including information item 0001 of record 200, that are associated with "clothes" as an attribute of a first type and "Indian" as an attribute of a second type. Also, the attribute pair ("American", "food") is associated with an aggregate score of 400, which can be determined by aggregating the scores of information items, including information item 0002 of record 200, that are associated with "food" as an attribute of a first type and "American" as an attribute of a second type. The aggregate scores for other attribute pairs (e.g., ("American", "clothes") and ("Indian", "food")) can also be generated based on the scores of other information items of record 200 not shown in FIG. 2A. In some embodiments, each of records 200 and 250 can be associated with a particular set of demographic information and/or location information used for filtering the information items included in the records.

After creating different associations of the attributes of the first type and second type, and determining an aggregate score for each attribute association, data analytics engine 106 may determine a first attribute of the first type (e.g., a product type, an activity type) that is associated with a maximum sum of aggregate score, which can indicate a maximum degree of engagement. For example, referring to Equations 1 and 2 below, and assuming that record 250 is represented as a matrix, number "i" may represent a certain number of row (e.g., "i=1" can refer to the first row for "clothes"), number "j" may represent a certain number of column (e.g., "j=1" can refer to the first column for "Indian"), and aggregate_score$_{i,j}$ may represent an entry of aggregate score in record 250 (e.g., aggregate_score$_{1,1}$ refers to the aggregate score for the attribute association ("Indian", "clothes"), which is 5000). The sum of aggregate scores for each of the attributes of the first type can be determined based on the Equations 1 and 2 below:

$$\text{sum\_o\_aggregate\_score}_i = \Sigma_{j=1}^{N} \text{aggregate\_score}_{i,j} \quad \text{(Equation 1)}$$

In Equation 1, N can be a value representing a total number of columns of record 250.

Data analytics engine 106 may then determine the first attribute of the first type to be the attribute of the first type associated with the maximum sum_o_aggregate_score$_i$.

Applying Equation 1 on the portion of record 250 as shown in FIG. 2B, data analytics engine 106 may determine that the first attribute of the first type to be "clothes" since the sum_of_aggregate_score$_i$ for "clothes" (25000) exceeds the sum_of_aggregate_score$_i$ for "food" (3400).

Further, data analytics engine 106 may also determine a second attribute of the second type (e.g., ethnic origin, targeted age group, targeted gender, location, etc.) that is associated with a minimum aggregate score, which can indicate a minimum degree of engagement. The aggregate score for each of the attributes of the second type can be determined based on the equations below:

$$\text{sum\_of\_aggregate\_score}_j = \Sigma_{i=1}^{M} \text{aggregate\_score}_{i,j} \quad \text{(Equation 1)}$$

In Equation 2, M can be a value representing a total number of rows of record 250.

Applying Equation 2 on the portion of record 250 as shown in FIG. 2B, data analytics engine 106 may determine that the second attribute of the second type to be "Indian" since the sum_of_aggregate_score$_j$ for "Indian" (8000) is below the sum_of_aggregate_score$_j$ for "American" (20400).

Further, data analytics engine 106 may also apply Equation 2 to determine a third attribute of the first type and a fourth attribute of the second type associated with a maximum aggregate_score$_{i,j}$ within record 250. As to be discussed below, the third attribute of the first type and the fourth attribute of the second type can be used for a determination of a set of configuration settings for information transmission, including one or more target locations to receive the information, and one or more senders for transmitting the information. Based on aggregate_score$_{i,j}$ as described above, data analytics engine 106 may determine that the third attribute of the first type to be "clothes" and the fourth attribute of the second type to be "American" based on that the aggregate_score$_{i,j}$ associated with the attribute pair ("American", "clothes") is the maximum among all other attribute pairs.

Based on a result of the analysis by data analytics engine 106, information generation engine 108 can determine an information item associated with the first and second attributes, with the information item being configured to bring to the user's attention about a type of product or a type of activity that is the most explored by a group of users (as reflected by a maximum degree of engagement and the maximum sum_of_aggregate_score$_i$), but which is also associated with a certain attribute (e.g., ethnic origin, location origin, targeted age group, targeted gender, etc.) that is the least explored by that group of users (as reflected by a minimum degree engagement and the minimum sum_of_aggregate_score$_j$). The information item can be obtained from data classification database 114, which stores the information item extracted from the real-time data, based on the first and second attributes.

As an illustrative example, based on the first and second attributes determined by data analytics engine 106, information generation engine 108 can determine that information item 0001 of record 200 can be transmitted, because it is associated with the first attribute of the first type ("clothes) and the second attribute of the second type ("Indian") determined based on equations 1 and 2. Information generation engine 108 may then determine that information content associated with information item 0001 is to be transmitted.

In some cases, information generation engine 108 can also determine to transmit an information item associated with the first and second attributes that is not extracted from the real-time data by data classification engine 104. For example, system 100 may interface with another database (not shown) that stores additional contents (e.g., media files, documents, etc.), in which the additional contents are also associated with the attributes of the first and second types. Information generation engine 108 can then acquire the additional contents from the database based on the first and second attributes determined by data analytics engine 106.

Information transmission engine 110 can determine a set of configurations for the transmission of information item determined by information generation engine 108, including one or more target locations for the transmission of information, and one or more senders for transmitting the information.

In some embodiments, information transmission engine 110 may determine one or more target locations for transmission of the information. As discussed before, data analytics engine 106 may determine the third attribute of the first type and the fourth attribute of the second type to be associated with the maximum aggregate_score$_{i,j}$. One or more information items associated with the first and third attributes can be associated with a type of product or a type of activity that is the most explored by a group of users and which is also associated with a certain attribute (e.g., ethnic origin, targeted age group, targeted gender, location, etc.) that is the most explored by the group of users (as reflected by the maximum aggregate_score$_{i,j}$). Information transmission engine 110 may determine the target locations based on the third and fourth attributes based on, for example, record 200. As discussed above, record 200 may associate an information item with location information, such as an URL of a web site where the real-time data including the information item is acquired. Information transmission engine 110 can then determine the target locations based on the location information.

By determining a location where information associated with the a popular type of product/service and with the a popular attributes is being consumed, and transmitting information associated with a type of product/service that is also popular (as reflected by the maximum sum_of_aggregate_score$_i$), but with attributes that are less popular (as reflected by the minimum sum_of_aggregate_score$_j$), the system can create a diverse user experience for visitors of the target location who consume the information. Using the illustrative example above, transmission engine 110 may determine to transmit information associated with Indian clothes (based on the first attribute of the first type and the second attribute of the second type) to a web server that hosts a e-commerce web site that displays American clothes (based on the third attribute of the first type and the fourth attribute of the second type) to potential shoppers. With such an arrangement, a diverse user experience can be created for the shoppers, such that they are exposed not only to American clothes (which the users are buying a lot, as reflected by the maximum aggregate_score$_{i,j}$), but also to Indian clothes (or clothes associated with other attributes).

In some embodiments, information transmission engine 110 may also determine one or more senders for transmission of the information, and to determine additional steps for the transmission. For example, in a case where an operator associated with a target location, and an operator that provides the determined information item, are different entities, information transmission engine 110 may transmit a request for permission for displaying the determined information to the operator associated with the target location. Using the illustrative example above, if the operator of the e-commerce website that sells American clothes is a different entity from the source of the information item associated with Indian clothes, information transmission engine 110 may transmit a request to the entity that operates the e-commerce website for permission to display the information item associated with Indian clothes. In some embodiments, the determination of whether to transmit the request can be based on a comparison between the first and the third attributes of the first type, and between the second and the fourth attributes of the second type. For example, if the target location and the information item are associated with different attributes of the first type and different attributes of the second type, information transmission engine 110 may determine to transmit the request to the target location for the permission. The determination can also be based on operator information (e.g., domain name of web server, etc.) associated with the information items in record 200. After receiving from the target location the permission, information transmission engine 110 may transmit the information items to the target location.

On the other hand, in a case where if the target location and the information item are associated with the same attribute of the first type (e.g., same type of product) but different attributes of the second type (e.g., different ethnic attributes), information transmission engine 110 may instead transmit an instruction to the target location to add the information item for displaying, or to update an operation. For example, in a case where the target location is an e-commerce web site, information transmission engine 110 may instruct the target location to update an existing offering of products to include same types of products as being offered, but with different ethnic attributes.

After the determination of the target location and sender information, information transmission engine 110 can then provide the determined information items to the determined sender (e.g., a web server) for transmission to the determined target location (e.g., a particular e-commerce site). The information items transmitted can include, for example, product information, promotion offers such as an offer to buy, to rent, or to try a specific product or service, etc.

After the transmission, real-time data engine 102 can continue receiving real-time data from the data sources to monitor for a response (e.g., an indication of acceptance of a promotion offer, an indication of browsing to a link included in the information item, etc.), real-time data engine 102 may transmit the response to feedback engine 112 for analysis.

In some embodiments, feedback engine 112 can create and update a machine learning model that determines demographical group information of the users who provide responses to the information items provided by information transmission engine 110 at the target locations. As discussed before, the demographical group information can be used by, for example, data classification engine 104 in filtering the information items extracted from the real-time data.

Figure 3:
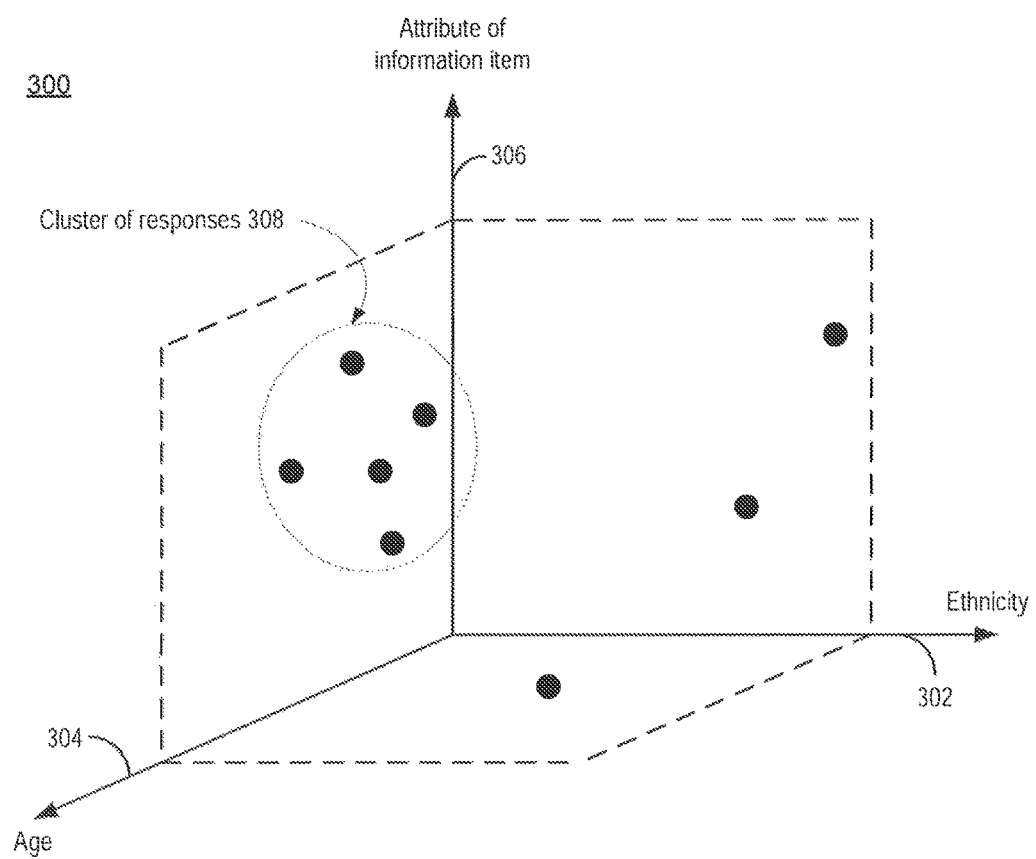
FIG. 3 illustrates a graphical representation of historical data for generating and transmitting information, according to some embodiments of the present disclosure.

A graphical representation of exemplary association information between the demographical information of the users and their responses is illustrated in FIG. 3. As shown in FIG. 3, graph 300 is three-dimensional and can include a first axis 302, a second axis 304, and a third axis 306. In some embodiments, first axis 302 can be associated with ethnicity information of the users who provided the response (e.g., making a purchase based on the information item, navigating to a link provided in the information item, etc.), second axis 304 can be associated with age information of the those users, and axis 306 can be associated with attributes (e.g., of the second type) associated with the information items provided, for which the users have responded. Although graph 300 as shown in FIG. 3 is three-dimensional, it is understood that graph 300 can include additional dimensions associated with, for example, attributes of the first type, location information of the users, etc.

In some embodiments, as shown in FIG. 3, feedback engine 112 may classify a received response based on an age and an ethnicity of a user who provided the response, and the attribute of the information item associated with the response, and record the response based on the classification. Feedback engine 112 may also determine a cluster of responses (e.g., cluster of responses 308) based on, for example a predetermined distance threshold between the responses (e.g., calculated based on deviation in age, ethnicity, attributes, etc. associated with the response). After determining a cluster of response, feedback engine 112 may determine a set of age and ethnicity information associated with the cluster of response, and provide the set of age and ethnicity information, as a pre-set demographic group information, to data classification engine 104 for filtering the information items. The association information (e.g., as represented by graph 300) can be updated based on new response data, and can be stored at (and retrieved from) feedback data database 116 of FIG. 1.

With embodiments of the present disclosure, a range of attributes of the first and second types, for information item generation, can be adjusted based on the users' responses. As a result, the information items provided by the users can be more pertinent to their interests while diverse user experience can still be provided. Therefore, user experience can be improved.

Figure 4A:
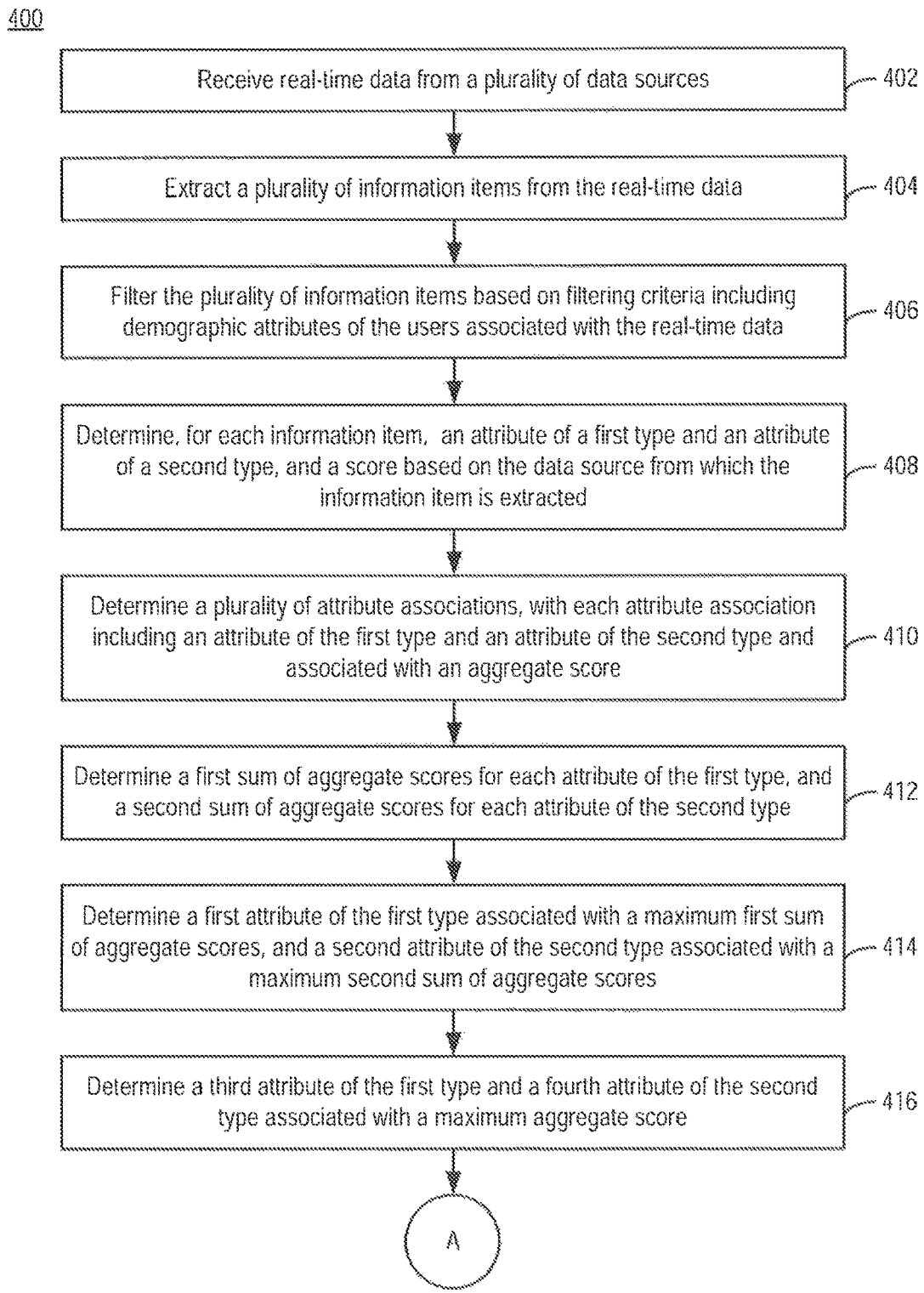
FIGS. 4A-4B illustrate an exemplary method for generating and transmitting information based on real-time and historical data, according to some embodiments of the present disclosure.
Figure 4B:
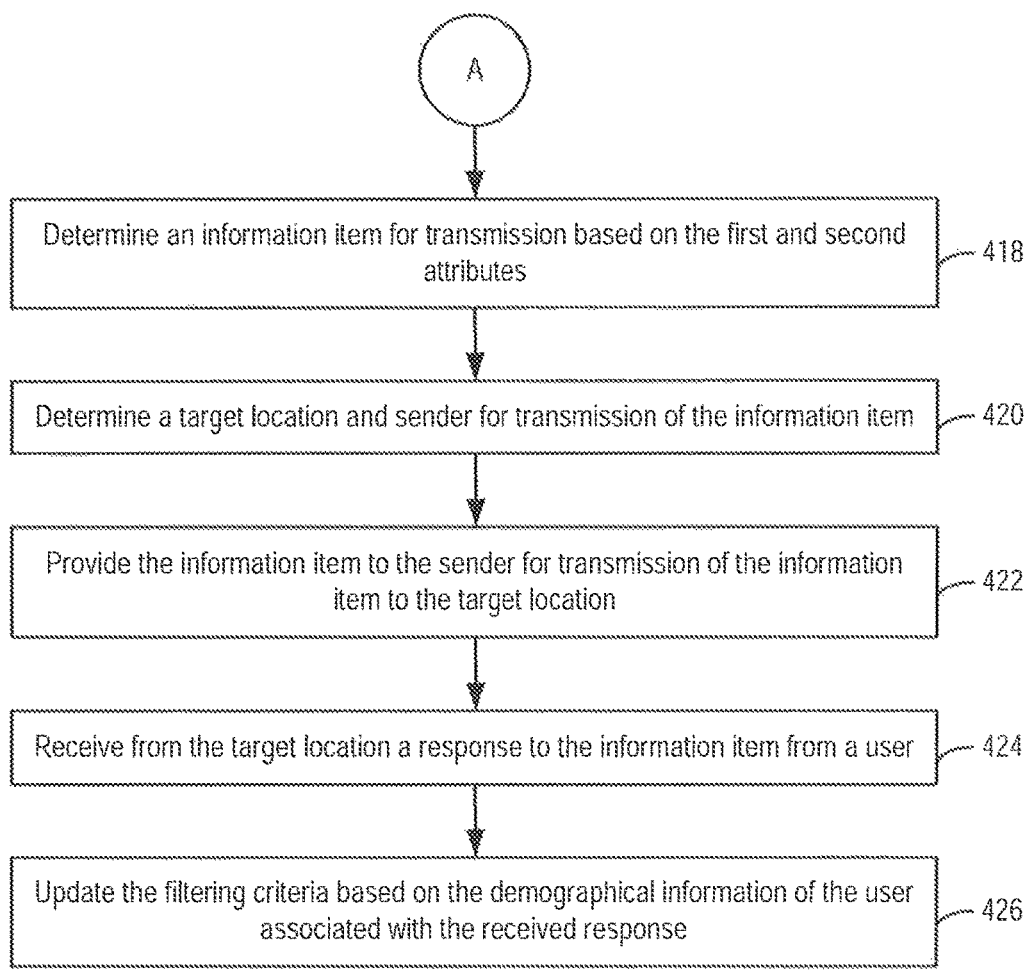

FIGS. 4A-4B are flow diagrams illustrating an exemplary method 400 for generating and transmitting information based on real-time and historical data, according to some embodiments of the present disclosure. In some embodiments, method 400 can be performed by, for example, system 100 of FIG. 1. As shown in FIGS. 4A-4B, method 400 may include the steps 402-426.

In step 402, the system may receive real-time data from a plurality of data sources. The data sources can include, for example, databases that store transaction data related to the purchase of a certain product, or an activity (e.g., purchasing a service) by a user. The transaction data can include, for example, the expense in the purchase, information about a type of the product or the activity (e.g., food, clothing, etc.), and information about an attribute of the product or the service (e.g., ethnic origin, location origin, targeted age group, targeted gender, etc.). In some embodiments, step 402 can be performed by real-time data engine 102 of FIG. 1.

In step 404, the system may extract a plurality of information items from the real-time data. The extraction can include parsing the data to generate a plurality of information items, and for each information item, an information item identifier, an attribute of a first type, an attribute of a second type, and a score. In some embodiments, step 404 can be performed by data classification engine 104 of FIG. 1.

In step 406, the system may filter the plurality of information items based on one or more filtering criteria including, for example, the demographic group of the users associated with the real-time data being part of a pre-set demographic group. In step 408, the system may determine, for each information item, an attribute of a first type and an attribute of a second type, and a score based on the data source from which the information item is extracted. The system may also associate the information items and attributes of the first and second types with the demographic and location information of the users. The pre-set demographic group can be determined based on a machine learning model constructed and updated based on historical feedback data reflecting the users' responses to the provided information item. In some embodiments, steps 406-408 can be performed by data classification engine 104 of FIG. 1.

In step 410, the system may determine a plurality of attribute associations, with each attribute association including an attribute of the first type and an attribute of the second type and associated with an aggregate score. In step 412, the system may determine a first sum of aggregate scores for each attribute of the first type, and a second sum of aggregate scores for each attribute of the second type. In step 414, the system may determine a first attribute of the first type associated with a maximum first sum of aggregate scores, and a second attribute of the second type associated with a maximum second sum of aggregate scores. In step 416, the system may determine a third attribute of the first type and a fourth attribute of the second type associated with a maximum aggregate score. In some embodiments, steps 410-416 can be performed by data analytics engine 106 of FIG. 1.

In step 418, the system may determine an information item for transmission based on the first and second attributes, such that the information item can bring to the user's attention about a type of product or a type of activity that is the most explored by a group of users, but which is also associated with a certain attribute (e.g., ethnic origin, location origin, targeted age group, targeted gender, etc.) that is the least explored by that group of users. In some embodiments, step 418 can be performed by information generation engine 108 of FIG. 1.

In step 420, the system may determine a target location and a sender for transmission of the information item. For example, the system may determine the target location based on the third and fourth attributes such that the target location is associated with a type of product or a type of activity that is the most explored by a group of users and which is also associated with a certain attribute (e.g., ethnic origin, targeted age group, targeted gender, location, etc.) that is the most explored by the group of users. The system may also determine one or more senders for transmission of the information, and to determine additional steps for the transmission. For example, in a case where an operator associated with a target location, and an operator that provides the determined information item, are different entities, information transmission engine 110 may transmit a request for permission of displaying the determined information to the operator associated with the target location. In step 422, the system may provide the information item to the sender for transmission of the information item to the target location. The information items transmitted can include, for example, product information, promotion offers such as an offer to buy, to rent, or to try a specific product or service, etc. In some embodiments, steps 420 and 422 can be performed by information transmission engine 110 of FIG. 1.

In step 424, the system may receive, from the target location (or a data source associated with the target location), a response to the information item from a user. The response can be received by real-time data engine 102 which can continue to receive real-time data from the data sources to monitor for a response (e.g., an indication of acceptance of a promotion offer, an indication of browsing to a link included in the information item, etc.).

In step 426, after receiving the response, the system can create and update the machine learning model that associates demographical information of the users with their responses. The system may classify a received response based on an age and an ethnicity of a user who provided the response, and the attribute of the information item associated with the response, and record the response based on the classification. The system may also determine a cluster of responses and the set of demographic information associated with the cluster, and provide the information to data classification engine 104 for filtering the information items. In some embodiments, step 426 can be performed by feedback engine 112 of FIG. 1.

Computer System

FIG. 5 is a block diagram of an exemplary computer system for implementing embodiments consistent with the present disclosure. Variations of computer system 501 may be used for implementing the devices and systems disclosed herein. Computer system 501 may comprise a central processing unit ("CPU" or "processor") 502. Processor 502 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described methods and systems for generation and transmission of information based on real-time and historical data. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A hardware processor-implemented method for generating and transmitting information, the method comprising:
   receiving real-time from a plurality of data sources;
   extracting a plurality of information items from the real-time data, wherein each of the plurality of information items is associated with an attribute of a first type, an attribute of a second type, and a first score;
   determining a plurality of attribute associations, wherein each of the plurality of attribute associations include one attribute of the first type and one attribute of the second type;
   determining, based on the first scores, an aggregate score for each of the plurality of attribute associations;
   determining a first sum of aggregate scores for each attribute of the first type;
   determining a second sum of aggregate scores for each attribute of the second type;
   determining a first attribute of the first type associated with a maximum first sum of aggregate scores, a second attribute of the second type associated with a minimum second sum of aggregate scores;
   determining a first information item for transmission based on the first and second attributes;
   determining a target location for transmission; and
   providing the first information item for transmission to the target location.

2. The method of claim 1, wherein the determination of the target location comprises:
   determining a third attribute of the first type and a fourth attribute of the second type associated with a maximum aggregate score;
   wherein the target location is determined based on the third and fourth attributes.

3. The method of claim 2, further comprising:
   determining a sender for transmission of the first information based on a first relationship between the first and third attributes of the first type, and a second relationship between the second and fourth attributes of the second type;
   wherein the first information is provided to the sender for transmission to the target location.

4. The method of claim 3, further comprising:
   if the first and third attributes are different, and if the second and fourth attributes are different, transmitting a request to the target location for permission of displaying the first information.

5. The method of claim 3, further comprising:
   if the first and third attributes are identical, and if the second and fourth attributes are different, transmitting an instruction to the target location to display the first information.

6. The method of claim 1, further comprising:
   receiving second information related to one or more users associated with the real-time data, wherein the plurality of attribute associations are determined based on the second information;
   receiving one or more responses from the target location after the first information is transmitted to the target location; and
   updating the second information based on the one or more responses.

7. The method of claim 1, wherein the target location is associated with a web server.

8. A system for generating and transmitting information, the system comprising:
   one or more hardware processors; and
   a memory storing instructions executable by the one or more hardware processors for:
     receiving real-time from a plurality of data sources;
     extracting a plurality of information items from the real-time data, wherein each of the plurality of information items is associated with an attribute of a first type, an attribute of a second type, and a first score;
     determining a plurality of attribute associations, wherein each of the plurality of attribute associations include one attribute of the first type and one attribute of the second type;
     determining, based on the first scores, an aggregate score for each of the plurality of attribute associations;
     determining a first sum of aggregate scores for each attribute of the first type;
     determining a second sum of aggregate scores for each attribute of the second type;
     determining a first attribute of the first type associated with a maximum first sum of aggregate scores, a second attribute of the second type associated with a minimum second sum of aggregate scores;

determining a first information item for transmission based on the first and second attributes;

determining a target location for transmission; and providing the first information item for transmission to the target location.

9. The system of claim 8, wherein the determination of the target location comprises the instructions executable by the one or more hardware processors for:

determining a third attribute of the first type and a fourth attribute of the second type associated with a maximum aggregate score;

wherein the target location is determined based on the third and fourth attributes.

10. The system of claim 9, wherein the memory stores instructions executable by the one or more hardware processors for:

determining a sender for transmission of the first information based on a first relationship between the first and third attributes of the first type, and a second relationship between the second and fourth attributes of the second type;

wherein the first information is provided to the sender for transmission to the target location.

11. The system of claim 10, wherein the memory stores instructions executable by the one or more hardware processors for:

if the first and third attributes are different, and if the second and fourth attributes are different, transmitting an instruction to the target location for permission of displaying the first information.

12. The system of claim 10, wherein the memory stores instructions executable by the one or more hardware processors for:

if the first and third attributes are identical, and if the second and fourth attributes are different, transmitting a request to the target location to display the first information.

13. The system of claim 8, wherein the memory stores instructions executable by the one or more hardware processors for:

receiving second information related to one or more users associated with the real-time data; wherein the plurality of attribute associations are determined based on the second information;

receiving one or more responses from the target location after the first information is transmitted to the target location; and updating the second information based on the one or more responses.

14. The system of claim 8, wherein the target location is associated with a web server.

15. A non-transitory computer readable storage medium storing a program that, when executed by one or more hardware processors, causes the one or more hardware processors to perform a method for generating and transmitting information, the method comprising:

receiving real-time from a plurality of data sources;

extracting a plurality of information items from the real-time data, wherein each of the plurality of information items is associated with an attribute of a first type, an attribute of a second type, and a first score;

determining a plurality of attribute associations, wherein each of the plurality of attribute associations include one attribute of the first type and one attribute of the second type;

determining, based on the first scores, an aggregate score for each of the plurality of attribute associations;

determining a first sum of aggregate scores for each attribute of the first type;

determining a second sum of aggregate scores for each attribute of the second type;

determining a first attribute of the first type associated with a maximum first sum of aggregate scores, a second attribute of the second type associated with a minimum second sum of aggregate scores;

determining a first information item for transmission based on the first and second attributes;

determining a target location for transmission; and providing the first information item for transmission to the target location, wherein the target location is a web server.

16. The medium of claim 15, wherein the determination of the target location comprises:

determining a third attribute of the first type and a fourth attribute of the second type associated with a maximum aggregate score;

wherein the target location is determined based on the third and fourth attributes.

17. The medium of claim 16, further comprising:

determining a sender for transmission of the first information based on a first relationship between the first and third attributes of the first type, and a second relationship between the second and fourth attributes of the second type;

wherein the first information is provided to the sender for transmission to the target location.

18. The medium of claim 17, further comprising:

if the first and third attributes are different, and if the second and fourth attributes are different, transmitting a request to the target location for permission of displaying the first information.

19. The medium of claim 17, further comprising:

if the first and third attributes are identical, and if the second and fourth attributes are different, transmitting an instruction to the target location to display the first information.

20. The medium of claim 15, further comprising:

receiving second information related to one or more users associated with the real-time data, wherein the plurality of attribute associations are determined based on the second information;

receiving one or more responses from the target location after the first information is transmitted to the target location; and updating the second information based on the one or more responses.

* * * * *